United States Patent
Sanderson

(10) Patent No.: US 10,247,321 B2
(45) Date of Patent: Apr. 2, 2019

(54) VALVE ARRANGEMENT

(71) Applicant: LB Bentley Limited, Stroud (GB)

(72) Inventor: Bryan Sanderson, Stroud (GB)

(73) Assignee: LB BENTLEY LIMITED, Shroud (GB)

( * ) Notice: Subject to any disclaimer, the term of this patent is extended or adjusted under 35 U.S.C. 154(b) by 0 days.

(21) Appl. No.: 15/532,736

(22) PCT Filed: Dec. 3, 2015

(86) PCT No.: PCT/GB2015/053698
§ 371 (c)(1),
(2) Date: Jun. 2, 2017

(87) PCT Pub. No.: WO2016/087862
PCT Pub. Date: Jun. 9, 2016

(65) Prior Publication Data
US 2017/0363218 A1    Dec. 21, 2017

(30) Foreign Application Priority Data
Dec. 4, 2014 (GB) .................................. 1421589.1

(51) Int. Cl.
*F16K 17/40* (2006.01)
*F16K 35/04* (2006.01)
*F16K 3/04* (2006.01)

(52) U.S. Cl.
CPC .............. *F16K 17/406* (2013.01); *F16K 3/04* (2013.01); *F16K 35/04* (2013.01)

(58) Field of Classification Search
CPC ...... F16K 17/40; F16K 17/403; F16K 17/406; F16K 3/0254; F16K 31/523

USPC ........ 137/68.16, 68.11, 68.15; 251/188, 161, 251/286, 310, 304
See application file for complete search history.

(56) References Cited

U.S. PATENT DOCUMENTS

| 4,203,460 A   | 5/1980 | Priese  |              |
|---------------|--------|---------|--------------|
| 4,427,070 A * | 1/1984 | O'Brien | E21B 34/063  |
|               |        |         | 137/70       |
| 4,511,120 A   | 4/1985 | Conley  |              |
| 4,744,390 A * | 5/1988 | Henry   | F16K 5/0242  |
|               |        |         | 137/797      |
| 5,046,523 A * | 9/1991 | Horhota | F16K 35/06   |
|               |        |         | 137/377      |

FOREIGN PATENT DOCUMENTS

| GB | 153652       | 11/1920 |
|----|--------------|---------|
| WO | WO2004/003411| 1/2004  |
| WO | WO2005/068885| 7/2005  |

OTHER PUBLICATIONS

Translation of WO2007003411 Oliver Valvetek LTD Jan. 8, 2004 pp. 1-6.*

* cited by examiner

*Primary Examiner* — P. Macade Nichols
(74) *Attorney, Agent, or Firm* — DeLio, Peterson & Curcio, LLC; Thomas E. Ciesco

(57) ABSTRACT

A valve arrangement comprises a rotatable part 32 rotatable relative to a stationary part 12, wherein one of the rotatable part 32 and the stationary part 12 includes an abutment surface 36a, 36b engageable with a stop associated with the other of the rotatable part 32 and the stationary part 12, wherein the stop comprises a stop pin 40 of hollow, substantially cylindrical form.

13 Claims, 2 Drawing Sheets

VALVE ARRANGEMENT

BACKGROUND OF THE INVENTION

1. Field of the Invention

This invention relates to a valve arrangement, and in particular to a valve arrangement including a valve member that is angularly moveable between open and closed positions.

2. Description of Related Art

Rotary or angularly adjustable valve arrangements are used in a wide range of applications for use in controlling the flow of fluid along pipelines or passages. By way of example, they are used in a number of subsea applications in the extraction of hydrocarbons. Where used in such environments, it is typically the case that the valve members of the valve arrangements are moved between their open and closed positions by remotely operated vehicles or the like, although depending upon their locations they may also be adjusted manually, for example by divers.

It is common for rotary or angularly adjustable valve arrangements to incorporate stops to limit the angle through which the valve members thereof can be moved, the stops being positions such that abutment or engagement occurs between the stops and features associated with the valve members of the valves when the valves occupy their fully open and/or fully closed positions.

Whilst the provision of such stops is useful in that the remotely operated vehicle or diver can simply keep adjusting the position of the valve member until engagement with the stop occurs in the knowledge that when such engagement occurs the valve will occupy its fully open or fully closed position, as appropriate, there is the risk that if there is a failure within the control system of the remotely operated vehicle used to adjust a valve, the remotely operated vehicle may continue to apply a torque to the valve arrangement after such a position has been attained, and the continued application of the torque may cause damage to the remotely operated vehicle.

Whilst the discussion hereinbefore relates to valves located in subsea environments adjusted by the use of remotely operated vehicles or the like, it will be appreciated that the invention is not restricted in this regard, and is also applicable to, for example, surface located valve arrangements that are intended to be adjusted by a motorised adjustment mechanism or other actuator.

SUMMARY OF THE INVENTION

It is an object of the invention to provide a valve arrangement in which at least some of the disadvantages with known arrangements are overcome or are of reduced effect.

According to the present invention there is provided a valve arrangement comprising a rotatable part rotatable relative to a stationary part, wherein one of the rotatable part and the stationary part includes an abutment surface engageable with a stop associated with the other of the rotatable part and the stationary part, wherein the stop comprises a stop pin of hollow, substantially cylindrical form.

The provision of a stop pin of hollow substantially cylindrical form allows the stop pin to be designed to shear in the event that a torque greater than a predetermined level is applied to the rotatable part once the abutment surface engages the stop, the shearing of the stop pin allowing the rotatable part to continue to rotate, thereby reducing the risk of damage to an actuator or the like applying the torque to the rotatable part.

The stop pin conveniently includes an inner bore, the diameter of which is preferably selected to determine the torque level at which the stop pin shears. The inner bore is conveniently a blind bore, the stop pin being orientated such that the end part of the stop pin including the blind end of the bore is the part of the stop pin engageable with the abutment surface.

The stop pin is conveniently provided with a region of reduced wall thickness, defining a shear line at which shearing of the stop pin will preferentially occur. The region of reduced wall thickness is preferably defined by an annular groove formed in the outer surface of the stop pin. The region of reduced wall thickness is preferably located such that, in use, in the event of shearing of the stop pin at the shear line, no remaining part of the stop pin attached to the said other of the rotatable part and the stationary part is able to engage the said one of the rotatable part and the stationary part including the abutment surface.

The said one of the stationary part and the rotatable part including the abutment surface preferably includes two abutment surfaces, one of the abutment surfaces engaging the stop when the valve arrangement occupies a fully open position and the other engaging the stop when the valve arrangement occupies a fully closed position.

Preferably, the stop is associated with the stationary part and the abutment surface(s) is/are provided on the rotatable part.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
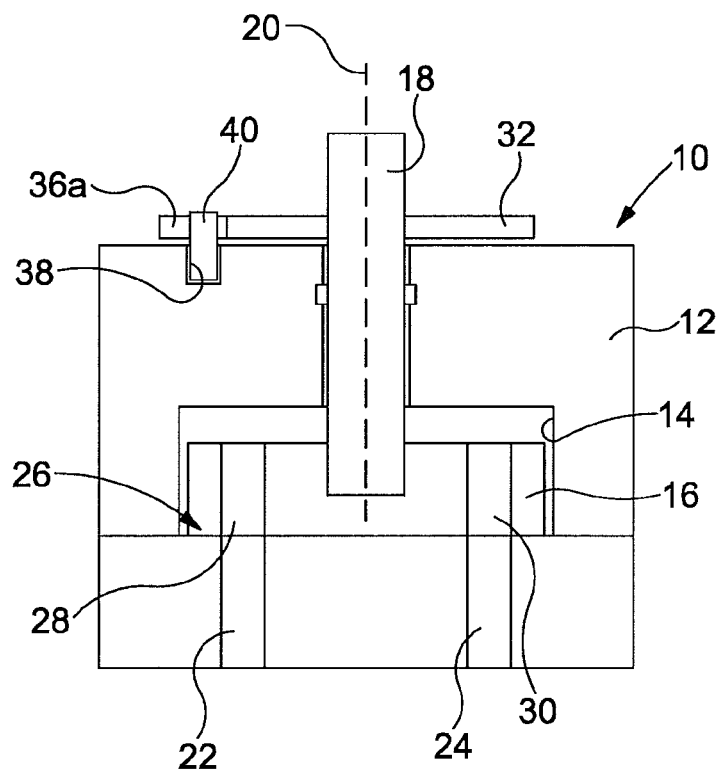
FIG. 1 is a diagrammatic view illustrating a valve arrangement in accordance with an embodiment of the invention.
Figure 2:
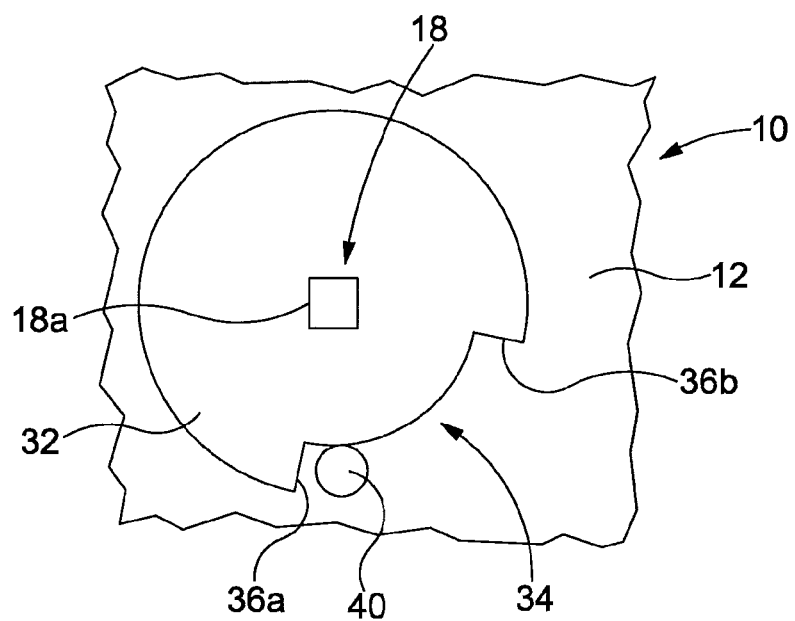
FIGS. 2 and 3 are views illustrating parts of the valve arrangement of FIG. 1.

Referring to the accompanying drawings, a valve arrangement 10 is illustrated which comprises a multi-part valve housing 12 defining a cavity 14. Within the cavity 14 is located a rotatable valve body 16, the valve body 16 being secured to an end of an adjustment spindle 18 that is rotatable about its axis 20.

The housing 12 includes a pair of passages 22, 24, that open into the cavity 14. The valve body 16 is biased, for example by a spring (not shown), into engagement with a sealing surface 26 defined by a part of the housing 12. As illustrated, the valve body 16 is provided with a pair of passages 28, 30 that, depending upon the angular orientation of the valve body 16, are registrable with the passages 22, 24.

In use, with the valve body 16 in the angular position shown in which the passages 28, 30 are aligned with the passages 22, 24, it will be appreciated that fluid is able to flow from the passage 22 through the passage 28 into the cavity 14, and from the cavity 14 through the passage 30 to the passage 24. Whilst described as permitting flow from the passage 22 to the passage 24, it will be appreciated that flow in the reverse direction is also permitted. Accordingly, with the valve body in the position shown, the valve arrangement is fully open. Rotation of the valve body 16 from this position to a position in which the passages 28, 30 are no longer registered with the passages 22, 24 closes the valve, preventing fluid flow between the passages 22, 24. The valve is also capable of being positioned in a number of intermediate positions in which flow between the passages 22, 24 is permitted at a restricted rate.

Whilst not shown, the valve body 16 may carry sealing members that engage the sealing surface 26 and sealingly close the ends of the passages 22, 24 when the valve arrangement occupies its fully closed position.

The spindle 18 projects from the housing 12 and is shaped, at an end thereof, to allow an actuator such as part of a remotely operated vehicle to engage the end of the spindle 18 and drive the spindle 18, and hence the valve body 16, for angular movement. By way of example, as illustrated, an end part 18a of the spindle 18 may be of square form or of another non-circular cross-sectional shape.

Attached to the spindle 18 for rotation therewith is a flange 32, the flange 32 including a region 34 of reduced radius. Abutment surfaces 36a, 36b are formed at each end of the region 34.

The housing 12 is provided with a blind bore 38 in a part thereof adjacent the region 34 of the flange 32. A stop pin 40 is located, in part, within the blind bore 38, a part of the stop pin 40 projecting from the housing 12 and being engageable with the abutment surfaces 36a, 36b upon angular movement of the spindle 18 to move the valve body 16 to its fully open or fully closed positions. The positioning of the stop pin 40 and the abutment surfaces 36a, 36b is such that when the valve occupies its fully open position in which the passages 28, 30 are fully aligned with the passages 22, 24, the stop pin 40 engages the abutment surface 36a, and when the valve occupies its fully closed position, the stop pin 40 engages the abutment surface 36b.

Figure 3:
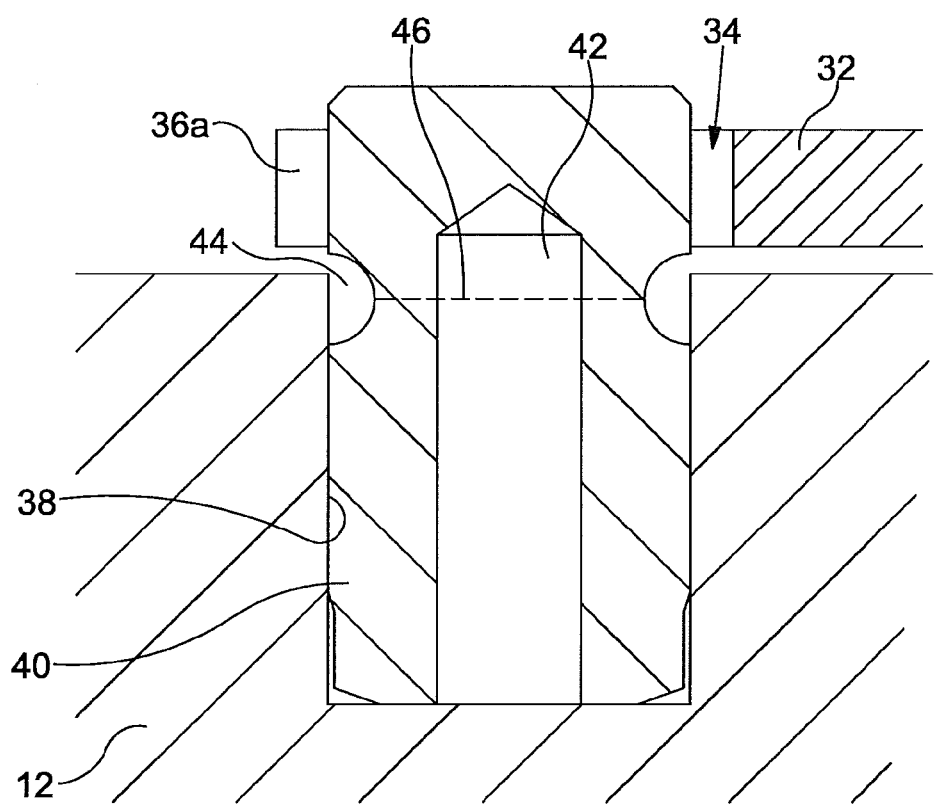

As shown in FIG. 3, the stop pin 40 is of hollow substantially cylindrical form, the stop pin 40 being provided with a blind counter bore 42. The stop pin 40 is orientated such that the open end of the bore 42 is located within the bore 38, the end of the stop pin 40 projecting from the bore 38 presenting a continuous surface rather than an opening, thus reducing the risk of matter accumulating within the blind bore 42, in use. Whilst the use of a blind bore 42 orientated as illustrated in FIG. 3 is currently preferred, it will be appreciated that this is not essential to the invention and that other arrangements are possible. For example, a through bore may be provided instead of a blind bore, or where a blind bore is provided, its open end may project from the housing 12.

The outer periphery of the stop pin 40 is provided with an annular groove 44 defining a region of the stop pin 40 of reduced wall thickness. The provision of the region of reduced wall thickness results in the stop pin 40 being most likely to shear along a shear line 46 aligned with the groove 44 in the event that a torque exceeding a predetermined level continues to be applied to the spindle 18 once a point has been reached at which one or other of the abutment surfaces 36a, 36b is in engagement with the stop pin 40.

The position in which the region of reduced wall thickness is provided is such that the shear line 46 is spaced from the volume swept by the flange 32, in use. Accordingly, in the event that the stop pin 40 shears along the shear line 46, the part of the stop pin 40 remaining attached to the housing 12 will not engage or otherwise interfere with the movement of the flange 32.

The diameter of the blind bore 42, and depth of the groove 44, may be chosen such that the stop pin 40 shears when a predetermined load is applied thereto to suit a particular application, for example to suit the nature of the remotely operated vehicle or other actuator used to drive the spindle 18 for movement, so as to ensure that the stop pin 40 shears before damage occurs to the remotely operated vehicle or a linkage between the remotely operated vehicle and the valve, or to another form of actuator.

In normal use, therefore, when it is desired to adjust the position of the valve, an appropriate actuator is used to engage the spindle 18 and drive the spindle 18 for movement, for example to drive the valve from its fully open position to its fully closed position. If the valve and actuator are operating correctly then when the valve reaches its fully closed position in which the passages 22, 24 are closed and the stop pin 40 engages the abutment surface 36b, the actuator will stop applying a torque to the spindle 18 and can be disconnected therefrom. However, in the event of a failure of the actuator, or incorrect control thereof, the actuator may continue to apply a torque to the spindle 18 after this position has been reached in which case, if the applied load is great enough, the stop pin 40 will shear at the shear line 46. Shearing of the stop pin 40 results in the flange 32 no longer being prevented for rotating and so allows the spindle 18 to continue to rotate, reducing the risk of further damage to the actuator. Despite shearing of the stop pin 40, the valve can continue to operate as normal by appropriate control over the position of the spindle 18 and valve body 16, the shearing of the stop pin 40 simply resulting in the positive stop normally provided when the valve reaches one or other of its fully open and fully closed positions no longer being present, the location of the shear line 46 such that the remaining part of the stop pin 40 attached to the housing 12 does not engage the flange 32 ensuring that the stop pin 40 does not restrict free movement of the flange 32.

Whilst in the arrangement illustrated, the shear line 46 is beneath the surface of the housing 12, this need not always be the case and arrangements are possible in which the shear line 46 is above the surface of the housing 12 and in which movement of the flange 32 is not restricted by the stop pin 40 once sheared in the manner described above.

By adjusting the diameter of the blind bore 42 to determine the torque level at which shearing of the stop pin 42 occurs, it will be appreciated that the outer diameter of the stop pin 40 remains unchanged. This is beneficial as if the outer diameter of the stop pin were to be changed, the position of the stop pin would also need to be modified to ensure that engagement of the stop pin with the abutment surfaces occurs at the correct angular positions of the valve body. By adjusting the diameter of the blind bore 42, modification of the stop pin 40 to shear at an applied load selected to suit the associated actuator can be achieved in a relatively simple and convenient manner.

In order to ease assembly, it may be desired to modify the stop pin 40 and/or bore 38 to avoid the formation of a hydraulic lock interfering with the introduction of the stop pin 40 into the bore 38. By way of example, part of the bore 38 or outer part of the pin 40 could be provided with one or more grooves, or a small diameter bleed bore may be provided which communicates with the bore 42 to allow fluids to escape from the bore 38 upon the introduction of the stop pin 40 thereto.

Whilst in the arrangement described above the stop pin 40 is mounted upon a stationary part of the valve in the form of the housing 12, and the abutment surfaces 36a, 36b are associated with a rotatable part of the valve in the form of the flange 32 rotatable with the spindle 18 to which the valve body 16 is attached, this need not be the case and the relative positions of these integers could be switched, if desired.

It will be appreciated that the description hereinbefore relates to just one example embodiment of the invention and that a number of modifications and alterations may be made thereto without departing from the scope of the invention. Whilst a specific form of valve is described, it will be appreciated that the invention is not restricted in this regard and may be applied to valves of a range of other designs.

What is claimed is:

1. A valve arrangement comprising a rotatable part rotatable relative to a stationary part, wherein one of the rotatable part and the stationary part includes an abutment surface engageable with a stop associated with the other of the rotatable part and the stationary part, wherein the stop comprises a stop pin of hollow, substantially cylindrical form, wherein the stop pin is provided with a region of reduced wall thickness, defining a shear line at which shearing of the stop pin will preferentially occur, the region of reduced wall thickness being located such that, in use, in the event of shearing of the stop pin at the shear line, no remaining part of the stop pin attached to the said other of the rotatable part and the stationary part is able to engage the said one of the rotatable part and the stationary part including the abutment surface, the stationary part comprising a valve housing, and the region of reduced wall thickness being located beneath a surface of the valve housing.

2. An arrangement according to claim 1, wherein the stop pin is designed to shear in the event that a torque greater than a predetermined level is applied to the rotatable part once the abutment surface engages the stop, the shearing of the stop pin allowing the rotatable part to continue to rotate, thereby reducing the risk of damage to an actuator or the like applying the torque to the rotatable part.

3. An arrangement according to claim 1, wherein the stop pin includes an inner bore, the diameter of which is selected to determine the torque level at which the stop pin shears.

4. An arrangement according to claim 3, wherein the inner bore is a blind bore.

5. An arrangement according to claim 1, wherein the said one of the stationary part and the rotatable part including the abutment surface includes two abutment surfaces, one of the abutment surfaces engaging the stop when the valve arrangement occupies a fully open position and the other engaging the stop when the valve arrangement occupies a fully closed position.

6. An arrangement according to claim 1, wherein the stop is associated with the stationary part and the abutment surface is provided on the rotatable part.

7. An arrangement according to claim 1, wherein the region of reduced wall thickness is defined by an annular groove formed in the outer surface of the stop pin.

8. A valve arrangement comprising a rotatable part rotatable relative to a stationary part, wherein one of the rotatable part and the stationary part includes an abutment surface engageable with a stop associated with the other of the rotatable part and the stationary part, wherein the stop comprises a stop pin of hollow, substantially cylindrical form, wherein the stop pin includes an inner bore in the form of a blind bore, the diameter of which is selected to determine the torque level at which the stop pin shears, wherein the stop pin is orientated such that the end part of the stop pin including the blind end of the bore is the part of the stop pin engageable with the abutment surface.

9. An arrangement according to claim 8, wherein the stop pin is provided with a region of reduced wall thickness, defining a shear line at which shearing of the stop pin will preferentially occur.

10. An arrangement according to claim 9, wherein the region of reduced wall thickness is defined by an annular groove formed in the outer surface of the stop pin.

11. An arrangement according to claim 9, wherein the region of reduced wall thickness is located such that, in use, in the event of shearing of the stop pin at the shear line, no remaining part of the stop pin attached to the said other of the rotatable part and the stationary part is able to engage the said one of the rotatable part and the stationary part including the abutment surface.

12. An arrangement according to claim 11, wherein the stationary part comprises a valve housing, and the region of reduced wall thickness is located beneath a surface of the valve housing.

13. A valve arrangement comprising a rotatable part rotatable relative to a stationary part, wherein one of the rotatable part and the stationary part includes an abutment surface engageable with a stop associated with the other of the rotatable part and the stationary part, wherein the stop comprises a stop pin of hollow, substantially cylindrical form, the stop pin being provided with a region of reduced wall thickness, defining a shear line at which shearing of the stop pin will preferentially occur, the stationary part comprising a valve housing, and the region of reduced wall thickness being located beneath a surface of the valve housing.

* * * * *